United States Patent
Day et al.

(12) 
(10) Patent No.: US 6,375,087 B1
(45) Date of Patent: Apr. 23, 2002

(54) METHOD AND APPARATUS FOR SELF-PROGRAMMABLE TEMPERATURE AND USAGE CONTROL FOR HOT WATER HEATERS

(75) Inventors: Paul Reuben Day; Mark William Theuer, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/593,874

(22) Filed: Jun. 14, 2000

(51) Int. Cl.[7] .................................. F24D 3/00
(52) U.S. Cl. .................... 237/8 A; 122/447; 122/448.1; 236/20 R
(58) Field of Search ................. 237/8 A, 2 A; 122/448.1, 447, 507; 236/20 R, 21 B

(56) References Cited

U.S. PATENT DOCUMENTS

| | | | |
|---|---|---|---|
| 4,508,261 A | * 4/1985 | Blank | 236/20 R |
| 4,834,284 A | * 5/1989 | Vandermeyden | 236/20 R |
| 4,935,603 A | * 6/1990 | Iwamoto et al. | 219/330 |
| 5,056,712 A | * 10/1991 | Enck | 236/20 R |
| 5,103,078 A | * 4/1992 | Boykin et al. | 219/494 |
| 5,294,051 A | 3/1994 | Piegari | |
| 5,361,729 A | * 11/1994 | Trihey | 122/17 |
| 5,626,287 A | * 5/1997 | Krause et al. | 236/20 R |
| 5,660,328 A | * 8/1997 | Momber | 236/20 R |
| 5,797,358 A | * 8/1998 | Brandt et al. | 122/448.1 |
| 5,968,393 A | * 10/1999 | Demaline | 219/492 |

* cited by examiner

Primary Examiner—Harold Joyce
Assistant Examiner—Derek S. Boles
(74) Attorney, Agent, or Firm—Joan Pennington

(57) ABSTRACT

A method and apparatus are provided for self-programmable temperature and usage control for a hot water heater. A plurality of user entered selections are received. Idle periods of a set time duration are detected and stored. Responsive to an idle period start time, a control temperature is set to a lower than normal temperature. Responsive to an idle period end time, the control temperature is set to a normal temperature. A sleep mode is automatically started responsive to idle times, and a vacation mode is automatically started responsive to an identified number of days of no water usage. In the sleep mode, the control temperature is set to a lower than normal temperature. In the vacation mode, the control temperature is set to a substantially lower than normal temperature or the water heater is turned off. The user entered selections can include a normal temperature, a sleep temperature for the idle periods, and a vacation temperature. The user entered selections can include the set time duration for idle periods and the number of days of no water usage for the vacation mode. The user entered selections can include manual overrides of idle periods, auto control and learning mode.

20 Claims, 20 Drawing Sheets

WEEKLY TABLE 200

| DAY 202 | | IDLE-TIME 204 | | SLEEP MODE ENABLED 206 | MANUAL MODE 208 (Y/N) (OVERRIDE) |
|---|---|---|---|---|---|
| | | START | END | | |
| MON | DAY | | | | |
| | NIGHT | | | | |
| TUE | DAY | | | | |
| | NIGHT | | | | |
| WED | DAY | | | | |
| | NIGHT | | | | |
| THU | DAY | | | | |
| | NIGHT | | | | |
| FRI | DAY | | | | |
| | NIGHT | | | | |
| SAT | DAY | | | | |
| | NIGHT | | | | |
| SUN | DAY | | | | |
| | NIGHT | | | | |

FIG.2A

USER PREFERENCES TABLE 210

| | | |
|---|---|---|
| TEMPERATURE NORMAL 212 | = | TEMPERATURE SETTING FOR NORMAL USAGE |
| TEMPERATURE SLEEP 214 | = | TEMPERATURE SETTING, LOWER THAN NORMAL USAGE TEMPERATURE |
| TEMPERATURE VACATION 216 | = | TEMPERATURE SETTING VACATION MODE, DEFAULT VALUE IS OFF (NO HOT WATER) |
| HOURS FOR LEARNING MODE OF IDLE TIME TO SET TABLE TO DROP INTO SLEEP MODE 218 | = | HOURS SETTING |
| NUMBER OF DAYS IDLE WITH NO WATER USAGE TO DROP INTO VACATION MODE 220 | = | DAYS SETTING |
| AUTO CONTROL ON/OFF 222 | = | ON/OFF SETTING CONTROL |
| LEARNING MODE ON/OFF 224 | = | ON/OFF SETTING LEARNING |
| MANUAL OVERRIDES 226 OF IDLE TIMES ENTERED INTO WEEKLY TABLE 200 OF FIG. 2A | = | OVERRIDES |

| N 602 | DAY | WATER ON |
|---|---|---|
| 1 | MONDAY | 6:10 am |
| 2 | MONDAY | 6:20 am |
| 3 | MONDAY | 6:45 am |
| 4 | MONDAY | 7:10 am |
| 5 | MONDAY | 5:00 pm |
| * | * | * |

CURRENT VALUE OF N 604

DAILY TABLE 600

| DAY OF WEEK 1202 | TIME SLOT 1204 | MOST RECENT (MR) 1206 | | | ACTIVITY THIS DAY 1208 | PERIOD ACTIVITY 1210 |
|---|---|---|---|---|---|---|
| | | (1) | (2) | (3) | | |
| * | | | | | | |
| * | | | | | | |
| MON | 6:00-6:15 A.M. | | | | | |
| MON | 6:15-6:30 A.M. | | | | | |
| MON | 6:30-6:45 A.M. | | | | | |
| * | | | | | | |
| * | | | | | | |

HISTORY TABLE 1200

FIG.12

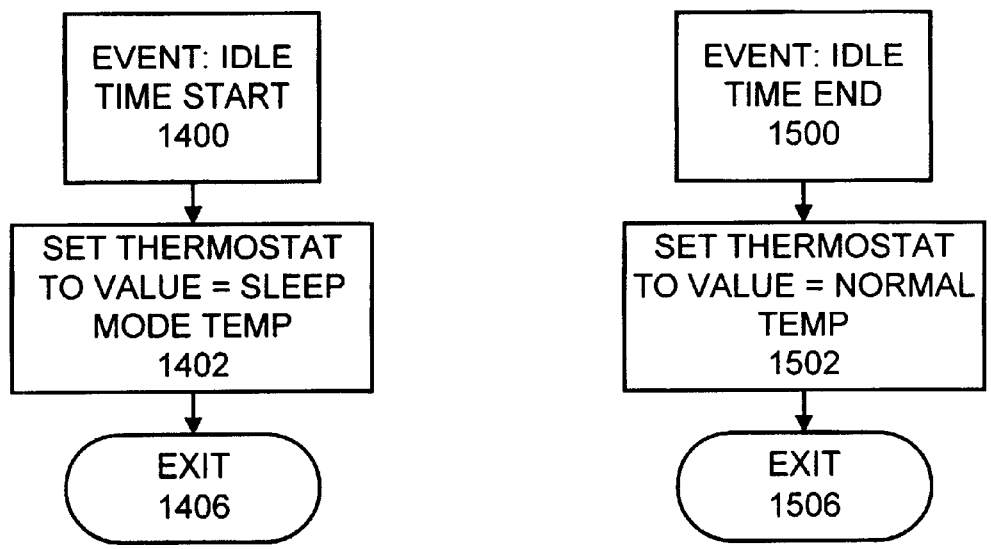

METHOD AND APPARATUS FOR SELF-PROGRAMMABLE TEMPERATURE AND USAGE CONTROL FOR HOT WATER HEATERS

FIELD OF THE INVENTION

The present invention relates to a method and apparatus for self-programmable temperature and usage control for hot water heaters.

DESCRIPTION OF THE RELATED ART

Typically a hot water heater heats hot water based upon a hot water heater temperature setting. The hot water heater is inefficient and consumes energy by heating the hot water when hot water is not needed. It heats the water whenever the water temperature drops below a fixed temperature. Known arrangements exist for programming the temperature setting to a high and low temperature during certain hours of the day or week. However, a problem with such arrangements is that it is difficult to program, and it is difficult to project the times of usage accurately.

U.S. Pat. No. 5,294,051 discloses a valve controller for a hot water heating system. The valve controller operates a water control valve between an open and a closed position. The valve controller includes a flow timer for variably establishing flow periodicity between a minimum flow time and a maximum flow time and a base cycle timer for variably establishing base cycle periodicity between a minimum flow time and a maximum flow time. The valve controller is used to control heating a building and is not directed to a hot water heater. The timing cycle is not self programmable and is not automatically adjusted based upon occupancy times in the building.

A need exists for an effective mechanism for efficiently controlling hot water heaters and for automatically adjusting the heat based upon usage. It is desirable to provide an improved method and apparatus for self-programmable temperature and usage control for hot water heaters.

SUMMARY OF THE INVENTION

A principal object of the present invention is to provide a method and apparatus for self-programmable temperature and usage control for hot water heaters. Other important objects of the present invention are to provide such method and apparatus for self-programmable temperature and usage control for hot water heaters substantially without negative effect; and that overcome many of the disadvantages of prior art arrangements.

In brief, a method and apparatus are provided for self-programmable temperature and usage control for a hot water heater, A plurality of user entered selections are received. Idle periods of a set time duration are detected and stored. Responsive to an idle period start time, a control temperature is set to a lower than normal temperature. Responsive to an idle period end time, the control temperature is set to a normal temperature.

In accordance with features of the invention, a sleep mode is automatically started responsive to idle times, and a vacation mode is automatically started responsive to an identified number of days of no water usage. In the sleep mode, the control temperature is set to a lower than normal temperature. In the vacation mode, the control temperature is set to a substantially lower than normal temperature or the water heater is turned off. The user entered selections can include a normal temperature, a sleep temperature for the idle periods, and a vacation temperature. The user entered selections can include the set time duration for idle periods and the number of days of no water usage for the vacation mode. The user entered selections can include manual overrides of idle periods, auto control and learning mode.

BRIEF DESCRIPTION OF THE DRAWINGS

The present invention together with the above and other objects and advantages may best be understood from the following detailed description of the preferred embodiments of the invention illustrated in the drawings, wherein:

FIGS. 2A and 2B are charts illustrating user selections or settings and user preferences for multiple modes for self-programmable temperature and usage control for hot water heaters in accordance with the preferred embodiment;

FIGS. 6 and 7 are charts respectively illustrating a daily table for storing water usage data and a vacation table including successive days of no water usage in accordance with the preferred embodiment;

FIGS. 12 and 13 are charts respectively illustrating a history table and a more detailed history table showing history activity in accordance with the preferred embodiment;

FIGS. 14, and 15 are flow charts illustrating exemplary sequential steps for self-programmable temperature and usage control for hot water heaters in accordance with the preferred embodiment.

DETAILED DESCRIPTION OF THE PREFERRED EMBODIMENTS

Figure 1:
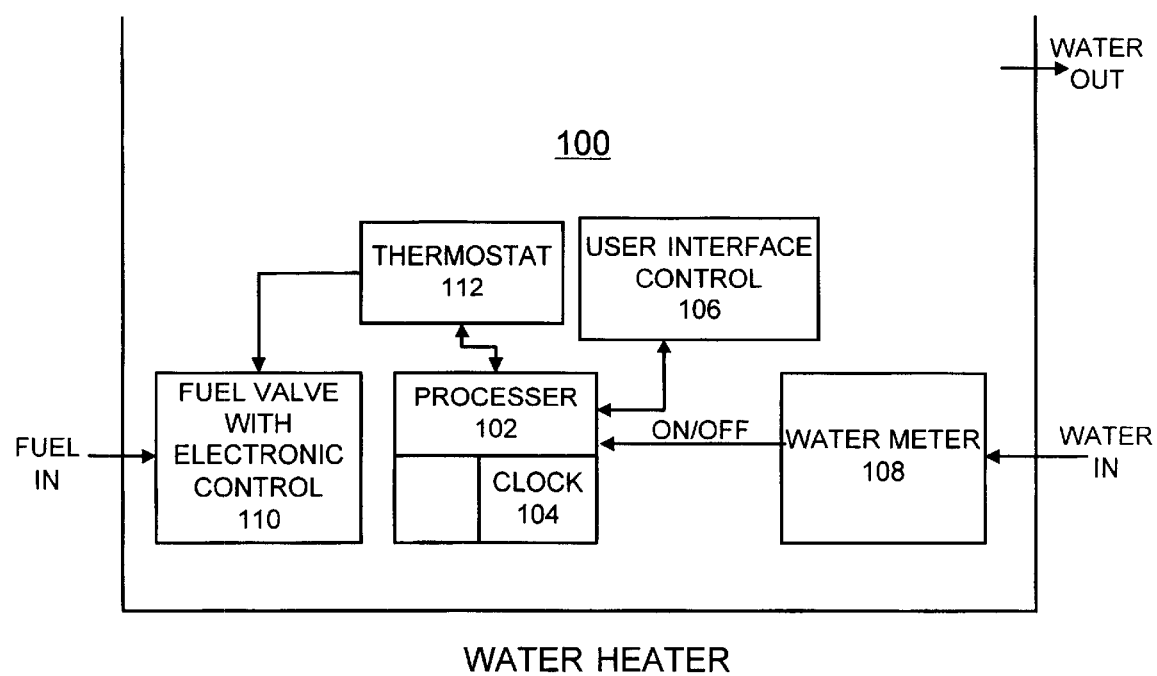
FIG. 1 is a block diagram representation illustrating an apparatus for self-programmable temperature and usage control for hot water heaters in accordance with the preferred embodiment.

Having reference now to the drawings, in FIG. 1, there is shown a water heater control system of the preferred embodiment generally designated by the reference character 100. As shown in FIG. 1, water heater control system 100 includes a processor control unit or CPU 102 including a clock 104. Clock 104 sends an event to CPU 102 at midnight; reports date, day of week, and time; and sends events to CPU 102 at idle start and idle end times for each day of the week. For idle end, clock 104 sends the event 30 minutes early to allow time to heat the water. Clock 104 uses a weekly table 200 illustrated and described with respect to FIG. 2A for idle start and idle end times. CPU 102 is connected to a user interface (UI) control 106 for receiving multiple user selections and preferences. CPU 102 is connected to a water meter 108 that provides an ON/OFF electronic signal to report an ON/OFF state indication to the CPU 102. The water in is controlled by the user turning on the hot water tap somewhere in the house. CPU 102 is coupled to a fuel valve with electronic control 110 via a thermostat 112 that is connected to the CPU 102, The fuel can be natural gas controlled by fuel valve 110. Also the fuel can be heating oil or electricity. CPU 102 applies a control signal to the thermostat 112 to set the water temperature to a desired value. The thermostat 112 provides a control signal to the fuel valve 110 to turn fuel ON/OFF.

Central processor unit 102 is suitably programmed to execute the flow charts of FIGS. 3A, 3B, 3C, 4, 5, 8, 9, 10, 11A, 11B, 11C, 14 and 15 of the preferred embodiment.

In accordance with features of the preferred embodiment, water heater control system 100 is an expert system arranged to calculate the water usage and times automatically, so the water can be ready for use during peak times, for example, at a hotter setting, and allowed to be kept at a lower setting at off peak times. For example, water heater control system 100 can learn that during an identified time interval, such as between 7 A.M. and 9 A.M., water usage is at a maximum and the water heater control system 100 can program itself so that the water is pre-heated to a maximum user selected setting by 7 A.M. in order to maintain a plentiful supply of hot water during these hours. During the day, when the users are at work or school, or during the middle of the night when no hot water is needed, water heater control system 100 can self program so that the water temperature is allowed to be lowered, thus saving energy.

In accordance with features of the preferred embodiment, water heater control system 100 can learn other patterns in addition to time of day. The water heater control system 100 can detect that during weekends, the usage hours are different. If the water usage changes during the week, for example, when relatives visit the house for a week, water heater control system 100 detects that water usage is high during new hours, and self programs for that week to the new hours. During vacations, water heater control system 100 can detect that water has not been turned on for a period of time, and go into a hibernation mode at a lower temperature until the water is turned on again. The hibernation mode can be a significantly lower temperature than for a normal day, providing substantial savings. The hibernation mode can be provided on a graduated scale based on the number of days water is not used, so that for a long weekend away from home, the hibernation temperature would not drop as low as for a two week vacation away from home.

Referring now to FIGS. 2A and 2B, there are shown charts illustrating user selections or settings and user preferences for multiple modes for self-programmable temperature and usage control for hot water heaters in accordance with the preferred embodiment. A weekly table 200 is shown in FIG. 2A. As shown, weekly table 200 includes for each day 202 two idle start and end times 204. For example, water heater control system 100 can detect and self program two idle start and end times 204 for each day 202. A sleep mode enabled function 206 enables the user to override the sleep mode temperature, entering no to leave temperature at normal during this time slot. The sleep mode means the thermostat 112 is set to a lower setting than normal, so that water is not at the peak hot temperature. A manual mode 208 enables the user to enter user selected idle start and end times in 204, entering yes and the water heater control system 100 uses the user selected values in 204 for the idle start and end times and does not automatically adjust the values in 204.

A user preferences table 210 is shown in FIG. 2B. User preferences table 210 includes a temperature normal 212 or temperature setting for normal usage; a temperature sleep 214 or temperature setting lower than the normal usage temperature setting; and a temperature vacation 216 or temperature setting for vacation mode, where a default is off with no hot water. A number of hours of idle time to set table to drop into sleep mode 218 is a user entered hours setting. A number of days idle with no water usage to drop into the vacation mode 220 is a user entered days setting. The vacation mode means the water temperature is much lower than the peak hot temperature. The default for vacation mode is the heater is OFF. Upon return from vacation, the user turns on the hot water to return control to the normal temperature mode. An auto control ON/OFF 222 enables the user to select ON or OFF setting control, if OFF then hot water is always set to the normal temperature 212. A learning mode ON/OFF 224 can be set to OFF so that history table functions are not used to compute idle times. A manual overrides function 226 enables user entry of idle times into the weekly table 200 of FIG. 2A.

Figure 3A:
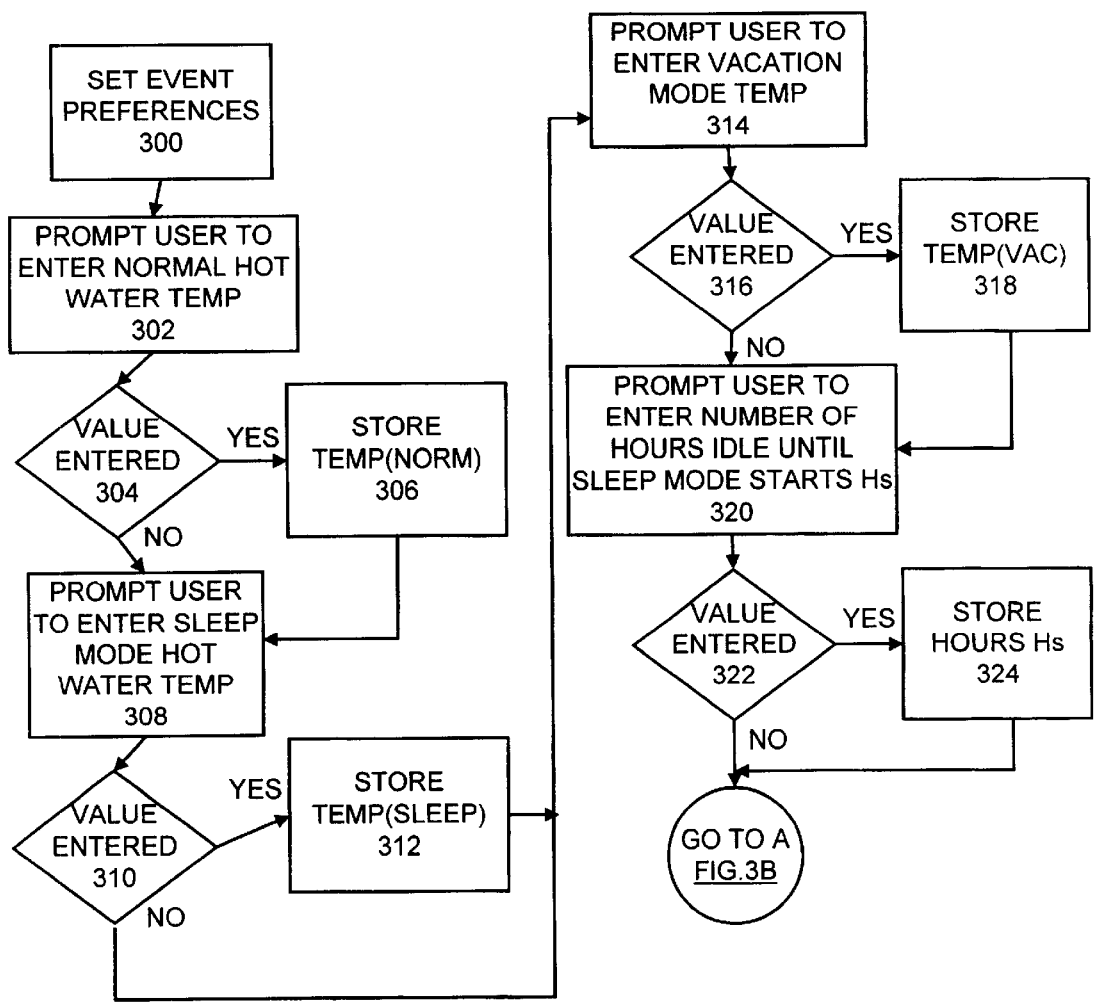
FIGS. 3A, 3B, 3C, 4, and 5 are flow charts illustrating exemplary sequential steps for self-programmable temperature and usage control for hot water heaters in accordance with the preferred embodiment.
Figure 3B:
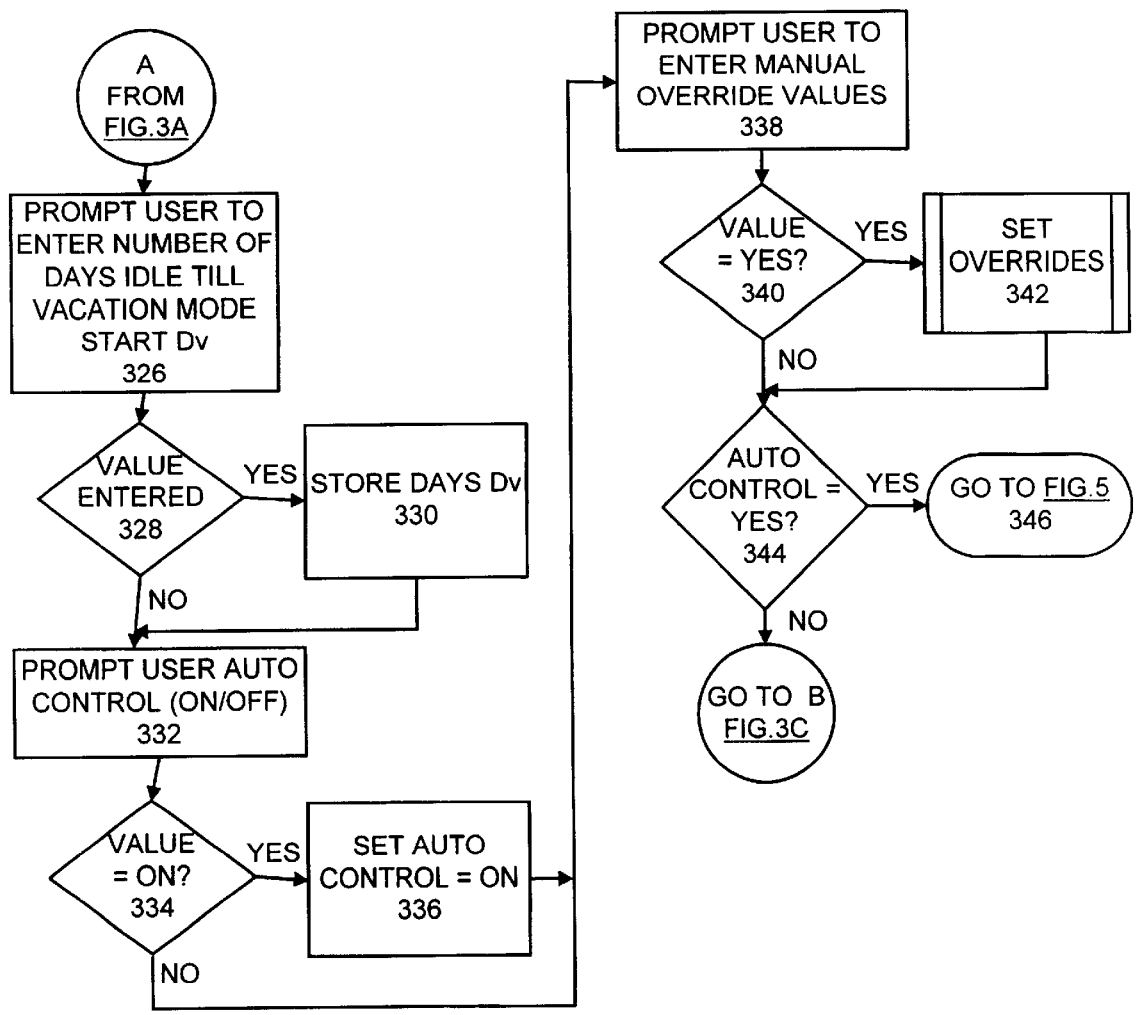
Figure 3C:
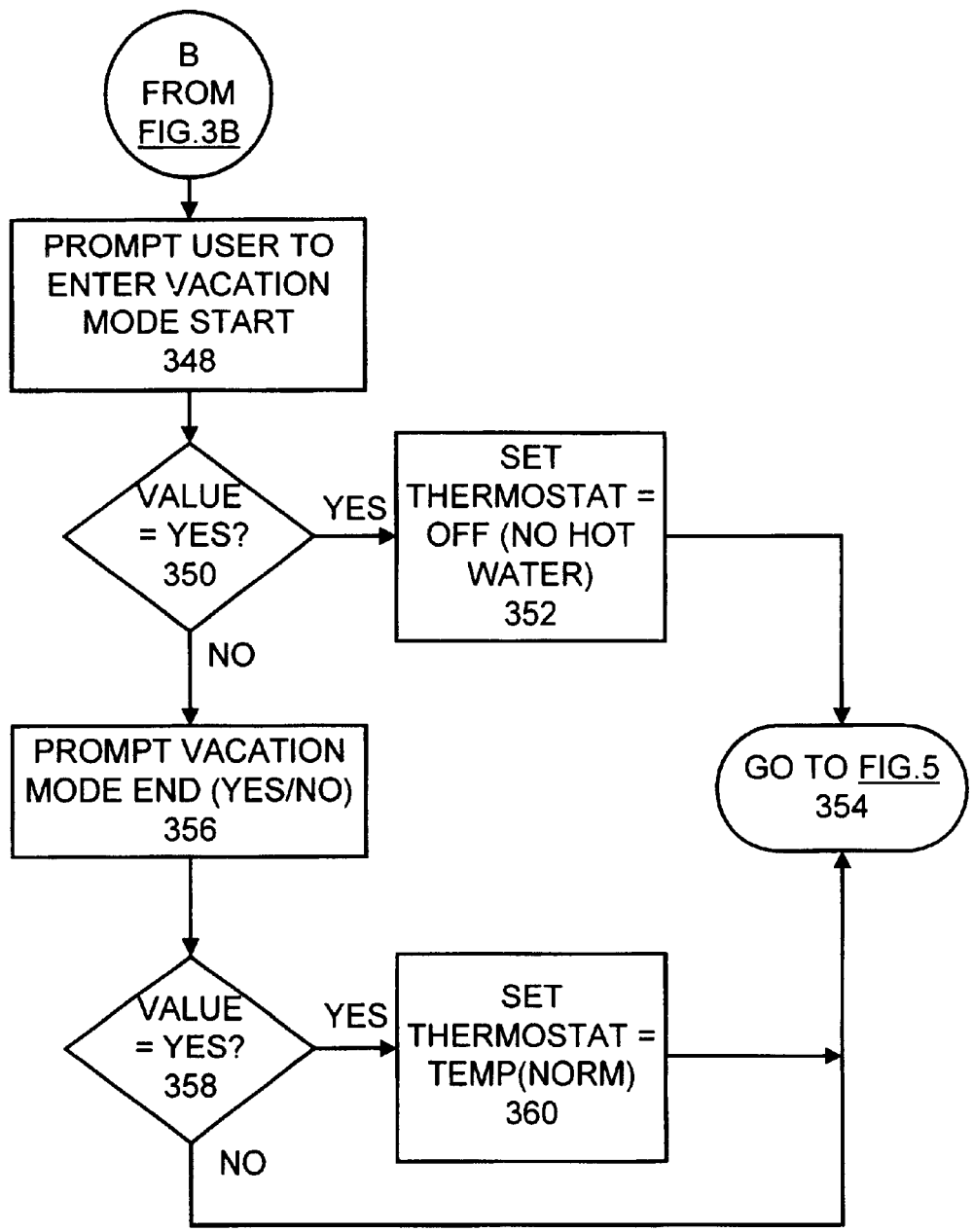

Referring now to FIGS. 3A, 3B, and 3C, there are shown flow charts illustrating exemplary sequential steps for entering user selection for self-programmable temperature and usage control for hot water heaters in accordance with the preferred embodiment. A presences event is set as indicated in a block 300. The user is prompted to enter a normal hot water temperature as indicated in a block 302. Checking for a value entered is performed as indicated in a decision block 304. For a value entered, the value is stored as the temperature normal 212 as indicated in a block 306.

When a value is not entered to change a preference, then the previous value is kept, which is initialized to default values from the manufacturer. Otherwise, the user is prompted to enter a sleep mode water temperature as indicated in a block 308. Checking for a value entered is performed as indicated in a decision block 310. For a value entered, the value is stored as the temperature sleep 214 as indicated in a block 312. Otherwise, the user is prompted to enter a vacation mode water temperature as indicated in a block 314. Checking for a value entered is performed as indicated in a decision block 316. For a value entered, the value is stored as the temperature vacation 216 as indicated in a block 318. For no value entered, the default temperature vacation is OFF for no hot water. Upon the user's return from vacation the user turns on hot water to start the heater and end the vacation mode. Otherwise, the user is prompted to enter a number of hours idle for dropping into sleep mode Hs as indicated in a block 320. The number of hours of no water usage is needed to effect an automatic sleep mode. It is used during the learning mode to detect an idle period for setting entries in a weekly table 200 of FIG. 2 for future usage. When an idle period of the given duration is detected, the start and end times of that period are saved, and these start and end times are used from then on. In operation, the heater does not have to remain idle this number of hours each time before dropping to the sleep mode. Checking for a value entered is performed as indicated in a decision block 322. For a value entered, the value is stored as the hours Hs as indicated in a block 324. Then the sequential operations continue following entry point A in FIG. 3B.

Referring to FIG. 3B, the user is prompted to enter a number of days idle before dropping into vacation mode Dv as indicated in a block 326. Checking for a value entered is performed as indicated in a decision block 328. For a value entered, the value is stored as the days Dv as indicated in a block 330. In operation, the days Dv is the number of idle days that must occur before dropping into the vacation mode. Otherwise, the user is prompted to enter an auto control ON/OFF 222 as indicated in a block 332. Checking for an ON value entered is performed as indicated in a decision block 334. For an ON value entered, the auto control is set to on. Otherwise, the user is prompted to enter manual overrides of auto values as indicated in a block 338.

Checking for manual overrides selection entered by the user is performed as indicated in a decision block 340. For a manual overrides selection entered by the user, then a set overrides routine 400 of FIG. 4 to set overrides is performed as indicated in a block 342. Checking for an auto control user entered selection is performed as indicated in a decision block 344. When an auto control user entered selection is identified, then the sequential operations illustrated and described with respect to FIG. 5 are performed as indicated in a block 346. Otherwise, the sequential operations continue following entry point B in FIG. 3C.

Referring to FIG. 3C, the user can manually indicate vacation mode to circumvent the automatic vacation mode detection. The user is prompted to enter a vacation mode start as indicated in a block 348. Checking for a vacation mode start user entered selection is performed as indicated in a decision block 350. When a vacation mode start user entered selection is identified, then the thermostat is set to OFF (no hot water) as indicated in a block 352. Then the sequential operations illustrated and described with respect to FIG. 5 are performed as indicated in a block 354. The user is prompted to enter a vacation mode end as indicated in a block 356. Checking for a vacation mode end user entered selection is performed as indicated in a decision block 358. When a vacation mode end user entered selection is identified, then the thermostat is set to temperature normal 212 as indicated in a block 360. Then the sequential operations illustrated and described with respect to FIG. 5 are performed as indicated in block 354.

Figure 4:
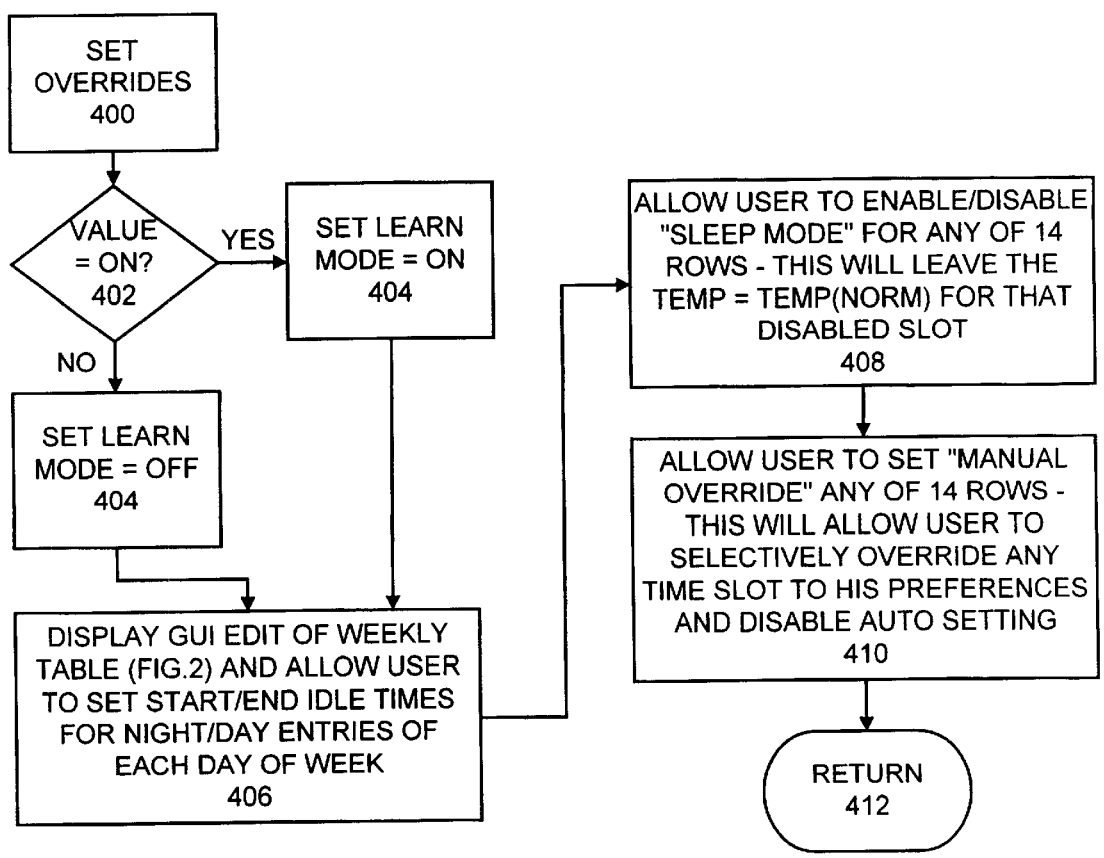
Figure 5:
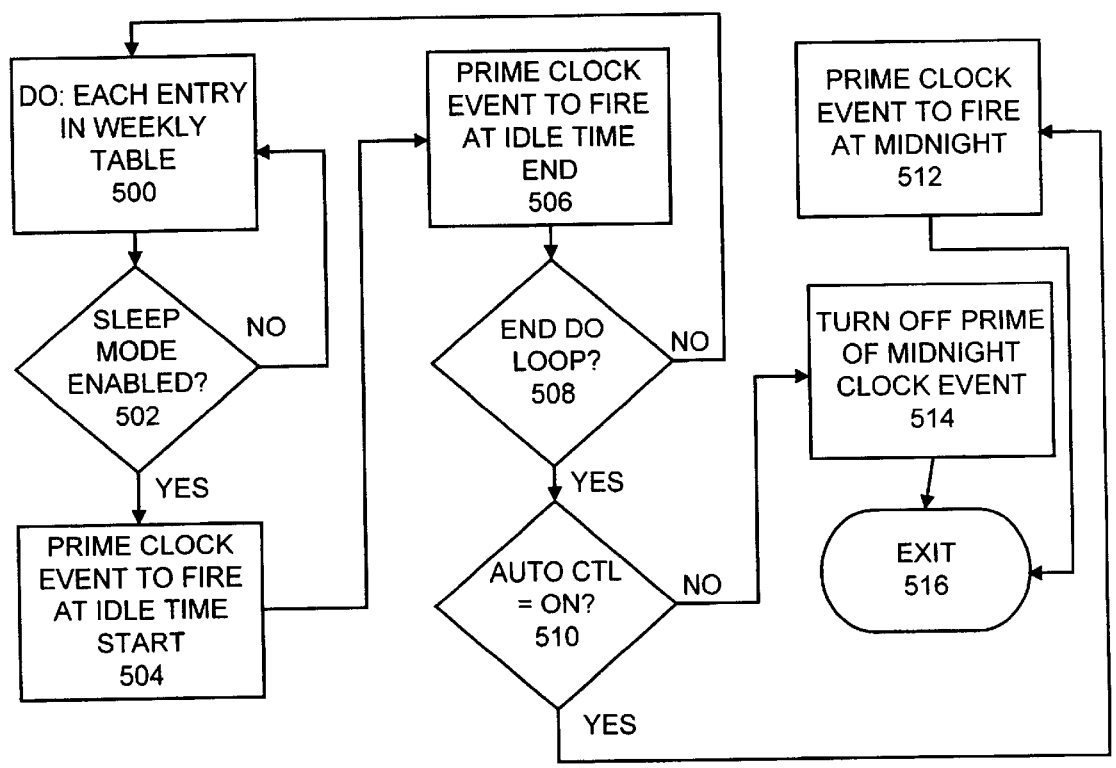

Referring to FIG. 4, there are shown exemplary sequential steps for entering user overrides for self-programmable temperature and usage control for hot water heaters in accordance with the preferred embodiment. The user entered selection to set learn mode is entered as indicated in a block 400. Checking for the set learn mode ON is performed as indicated in a decision block 402. If yes, the learn mode is set ON as indicated in a block 404. If no, the learn mode is set OFF as indicated in a block 406. Next a graphical user interface (GUI) edit of the weekly table 200 of FIG. 2A is displayed and the user is allowed to set start and end idle times for night and day entries of each day of the week as indicated in a block 406. This provides the user an easy way to set all entries at once to same values, if desired, or to selectively override any single entry to desired start and end times. Next the user is allowed to enable or disable the "sleep mode" for any of the 14 rows of the weekly table 200 of FIG. 2A as indicated in a block 408. The temperature will be set to temperature normal 212 for each disabled sleep mode slot. The user is allowed to set manual override for any of the 14 rows of the weekly table 200 of FIG. 2A as indicated in a block 410. This allows the user to selectively override any time slot to the user's preferences and disable auto setting of start and end times for that slot. Then the sequential operation return as indicated in a block 412.

Referring to FIG. 5, there are shown exemplary sequential steps for self-programmable temperature and usage control for hot water heaters in accordance with the preferred embodiment. First each entry in the weekly table 200 of FIG. 2A is processed as indicated in a block 500. Checking whether the sleep mode is enabled for this entry is performed as indicated in a decision block 502. When the sleep mode is not enabled, then the sequential operations return to block 500 to process a next entry in the weekly table 200. Otherwise if yes, then a clock event is primed to fire at idle time start as indicated in a block 504. Then a clock event is primed to fire at idle time end as indicated in a block 506. Checking for the end of do loop is performed as indicated in a decision block 508. When the end of do loop is not identified, then the sequential operations again return to block 500. Otherwise when the end of do loop is identified, then checking whether auto control is ON is performed as indicated in a decision block 510. When auto control is ON, then a clock event is primed to fire at midnight as indicated in a block 512. When auto control is not ON, then the prime of the midnight clock event is turned off as indicated in a block 514. Then the sequential operations exit as indicated in a block 516.

Figure 7:
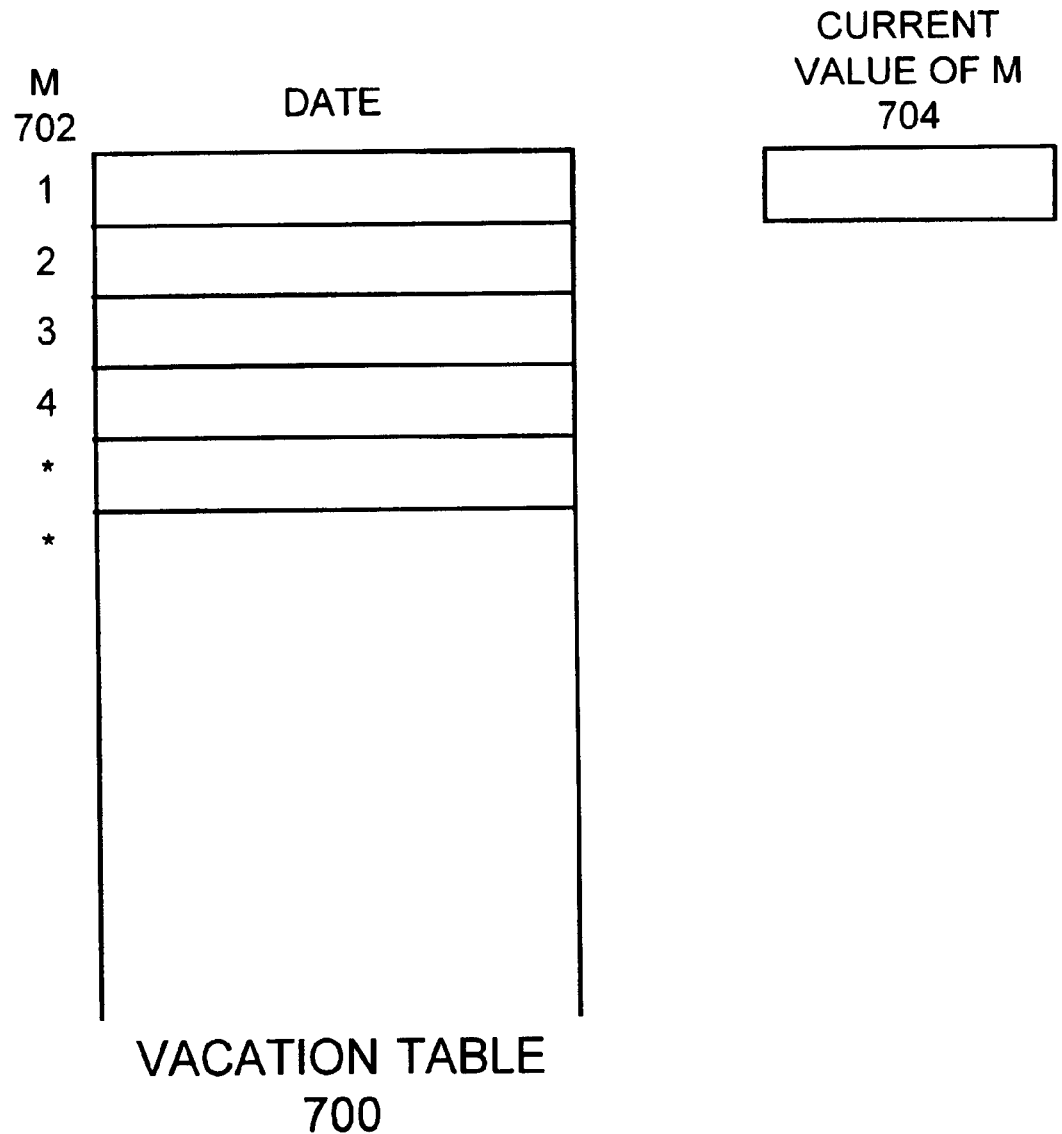

Referring now to FIGS. 6 and 7, there are shown charts respectively illustrating a daily table 600 for storing water usage data and a vacation table 700 including successive days of no water usage in accordance with the preferred embodiment. Daily table 600 stores entries N 602 of water on, day and time values. A current value of N 604 is stored. Vacation table 700 stores entries M 702 of days of no water usage and a current value of M 704 equal to a number of successive days of no hot water usage is stored. When the current value of M 704 equals zero, then there are no entries. When the current value of M 704 is greater than zero, then there is at least one day of no hot water usage.

Figure 8:
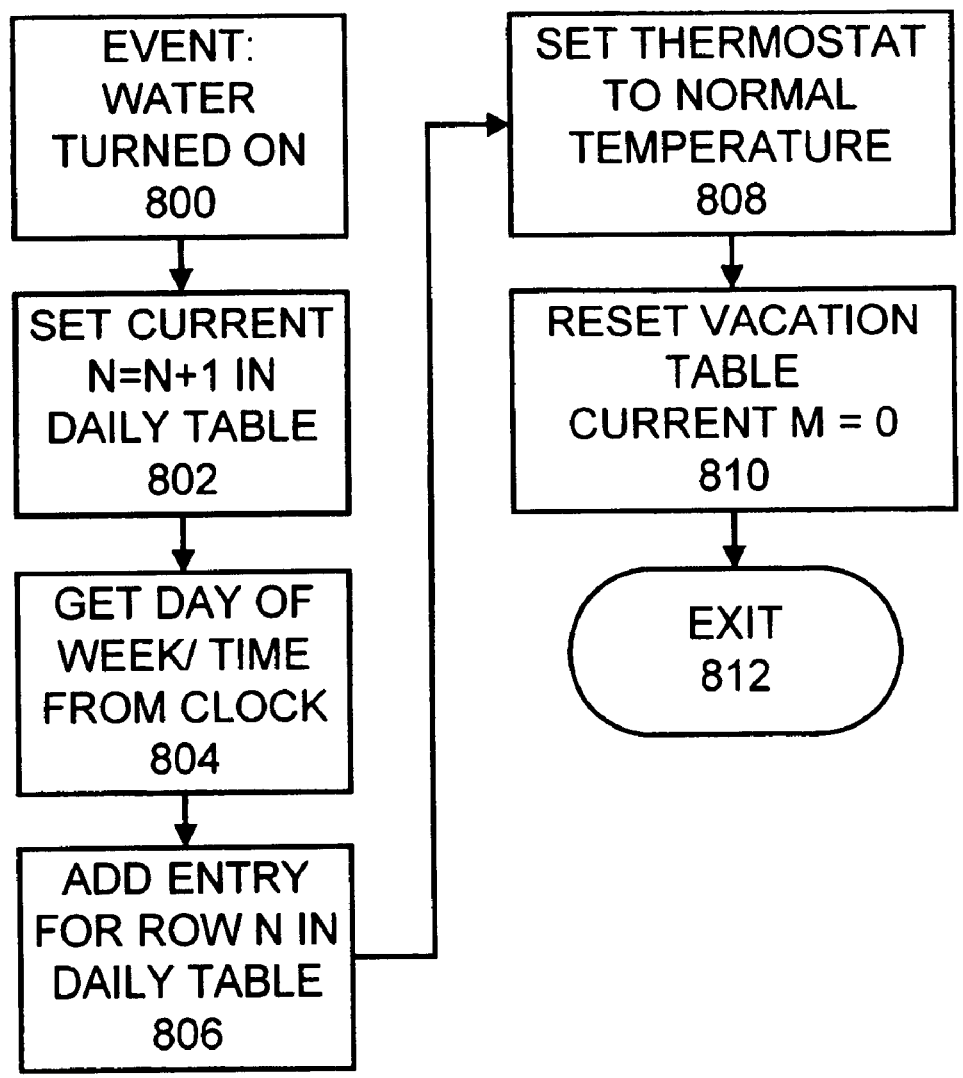
FIGS. 8, 9, 10, 11A, 11B, and 11C are flow charts illustrating exemplary sequential steps for self-programmable temperature and usage control for hot water heaters in accordance with the preferred embodiment.

Referring to FIG. 8, there are shown exemplary sequential steps for maintaining the daily table 600 and the vacation table 700 for self-programmable temperature and usage control for hot water heaters in accordance with the preferred embodiment. First an event of the hot water turned on is identified from the ON/OFF signal from the water meter 108 applied to CPU 102 as indicated in a block 800. The current value N 602 is set to N+1 in the daily table 600 as indicated in a block 802. The day of week and time is obtained from clock 104 as indicated in a block 804. An entry for row N is added in the daily table 600 as indicated in a block 806. Thermostat 112 is set to the normal temperature as indicated in a block 808, because hot water is now being used, to make sure the thermostat is back to normal in case it has been in a sleep setting or in hibernation. The current value M 704 in the vacation table 700 is reset to zero as indicated in a block 810. Then the sequential operations are exited as indicated in a block 812.

Figure 9:
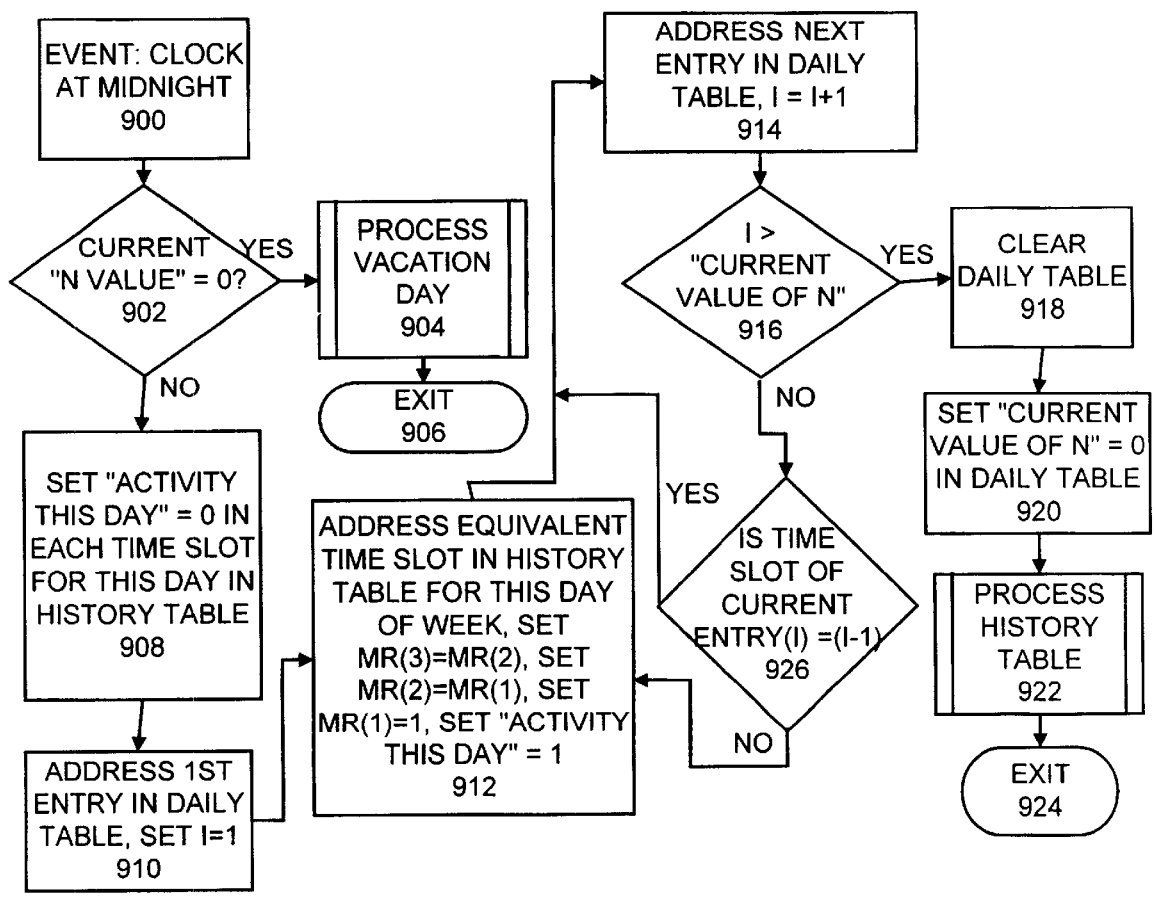

Referring to FIG. 9, there are shown exemplary sequential steps for self-programmable temperature and usage control for hot water heaters in accordance with the preferred embodiment. The purpose of the steps of FIG. 9, the processing of the midnight clock event, is to populate the history table 1200 with water-on indicators for each 15 minute slot in which hot water was used during that day. A once a day clock event at midnight is identified as indicated in a block 900. Checking whether the current value of N 604 is zero is performed as indicated in a decision block 902. If the current value of N 604 is zero indicating no hot water used this day, then as indicated in a block 904 the vacation day is processed as illustrated and described with respect to FIG. 10. Then the sequential operations are exited as indicated in a block 906. If the current value of N 604 is not zero, initially an activity this day is set to zero in each time slot for this day of week, for example, Monday, in the history table 1200 illustrated and described with respect to FIG. 12. Then a first entry in the daily table 600 is addressed, setting I=1, as indicated in a block 910. An equivalent time slot in the history table 1200 is addressed for this day of week, for example, 6-6:15 am, Monday, setting MR(3)=MR(2); MR(2)=MR(1); and MR(1)=1 and activity this day is set to 1 as indicated in a block 912. The purpose of history table 1200 of FIG. 12 is to record hot water usage during the most recent 3 days in each 15 minute time slot, for use in the learning mode. MR(1) refers to a most recent day 1 or one day ago; MR(2) refers to a most recent day 2, or the day before MR(1); and MR(3) is the day before MR(2). In the history table 1200, an activity this day field 1208 indicates that water was used at least once this day in this 15 minute time slot. A period activity 1210 means that MR (1), (2), (3) are not all zero, meaning that this time slot had activity once or more in the last 3 days.

A next entry in the daily table 600 is addressed, setting I=I+1, as indicated in a block 914. Then checking whether I>the current value of N 604 is performed as indicated in a decision block 916. When I is greater then the current value of N 604, then the daily table 600 is cleared as indicated in a block 918. The current value of N 604 is set to zero in the daily table 600 as indicated in a block 920. As indicated in a block 922, the history table is processed, as illustrated and described with respect to FIGS. 11A, 11B and 11C. Then the sequential operations are exited as indicated in a block 924. When I is not greater then the current value of N 604, then checking whether the time slot of current entry (I) is the same time slot as last entry (I−1) is performed as indicated in a decision block 926. When the time slot of current entry (I) is the same time slot as last entry (I−1), then the sequential operations return to block 914 to address a next entry in the daily table. Otherwise when the time slot of current entry (I) is not the same time slot as last entry (I−1), then the sequential operations return to block 912 to address an equivalent time slot in the history table 1200.

Figure 10:
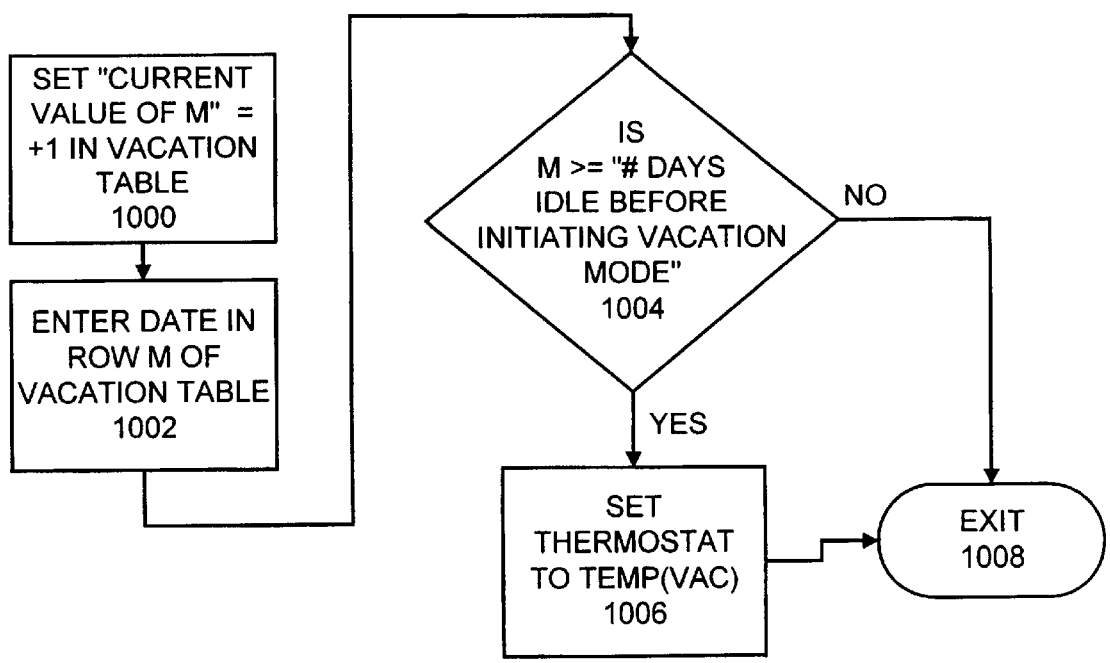

Referring to FIG. 10, there are shown exemplary sequential steps for processing a vacation day for self-programmable temperature and usage control for hot water heaters in accordance with the preferred embodiment. A current value of M 704 is incremented by 1 in the vacation table 700 as indicated in a block 1000. The date in row M of the vacation table 700 is entered as indicated in a block 1002. Next checking whether M is greater than or equal to the number of days idle before dropping into vacation mode 220 is performed as indicated in a decision block 1004. When M is greater than or equal to the number of days idle before dropping into vacation mode, then the thermostat 112 is set to the vacation temperature as indicated in a block 1006. After setting the vacation temperature 216 and when M is less than the number of days idle before dropping into vacation mode, then the sequential operations are exited as indicated in a block 1006.

Figure 11A:
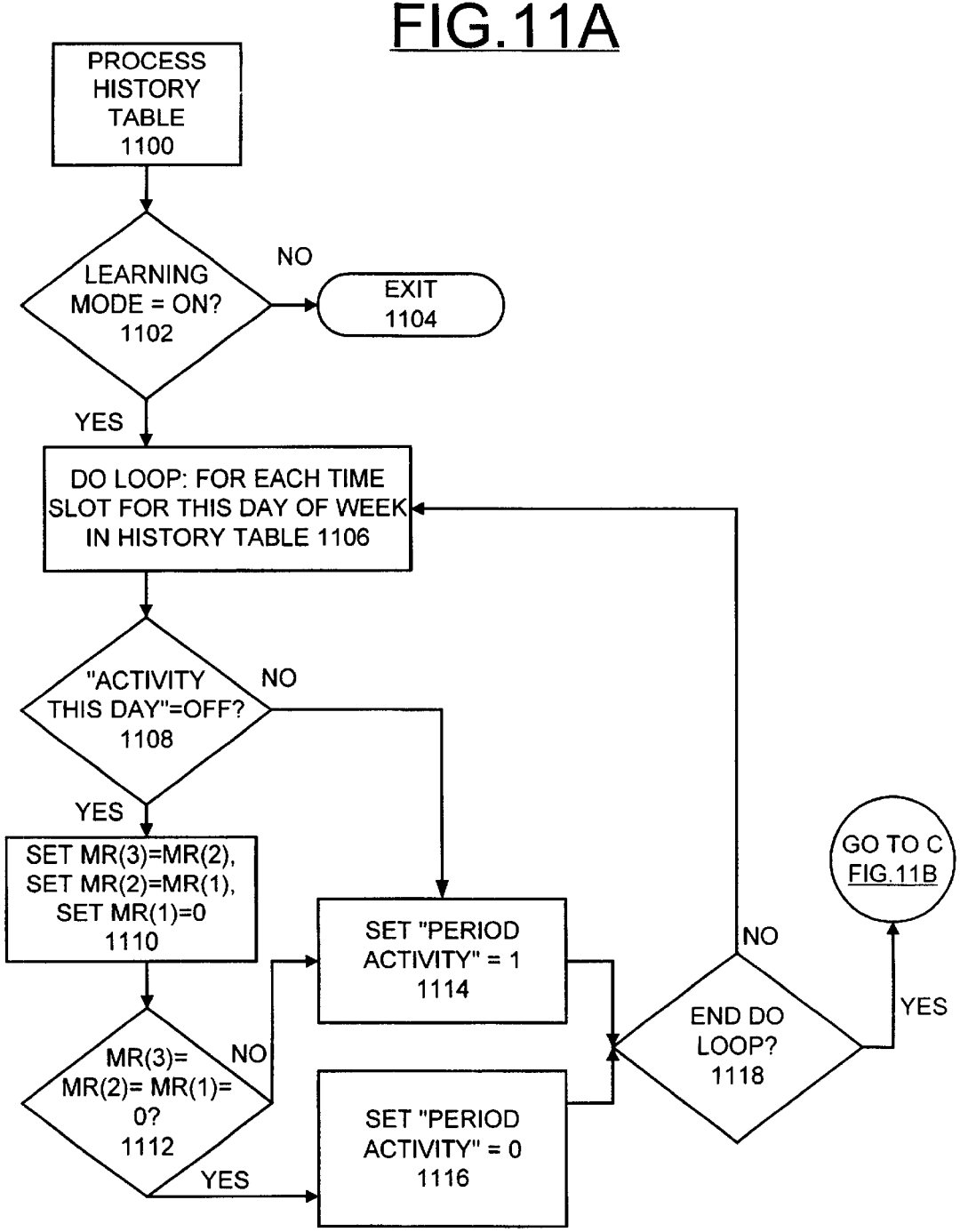
Figure 11B:
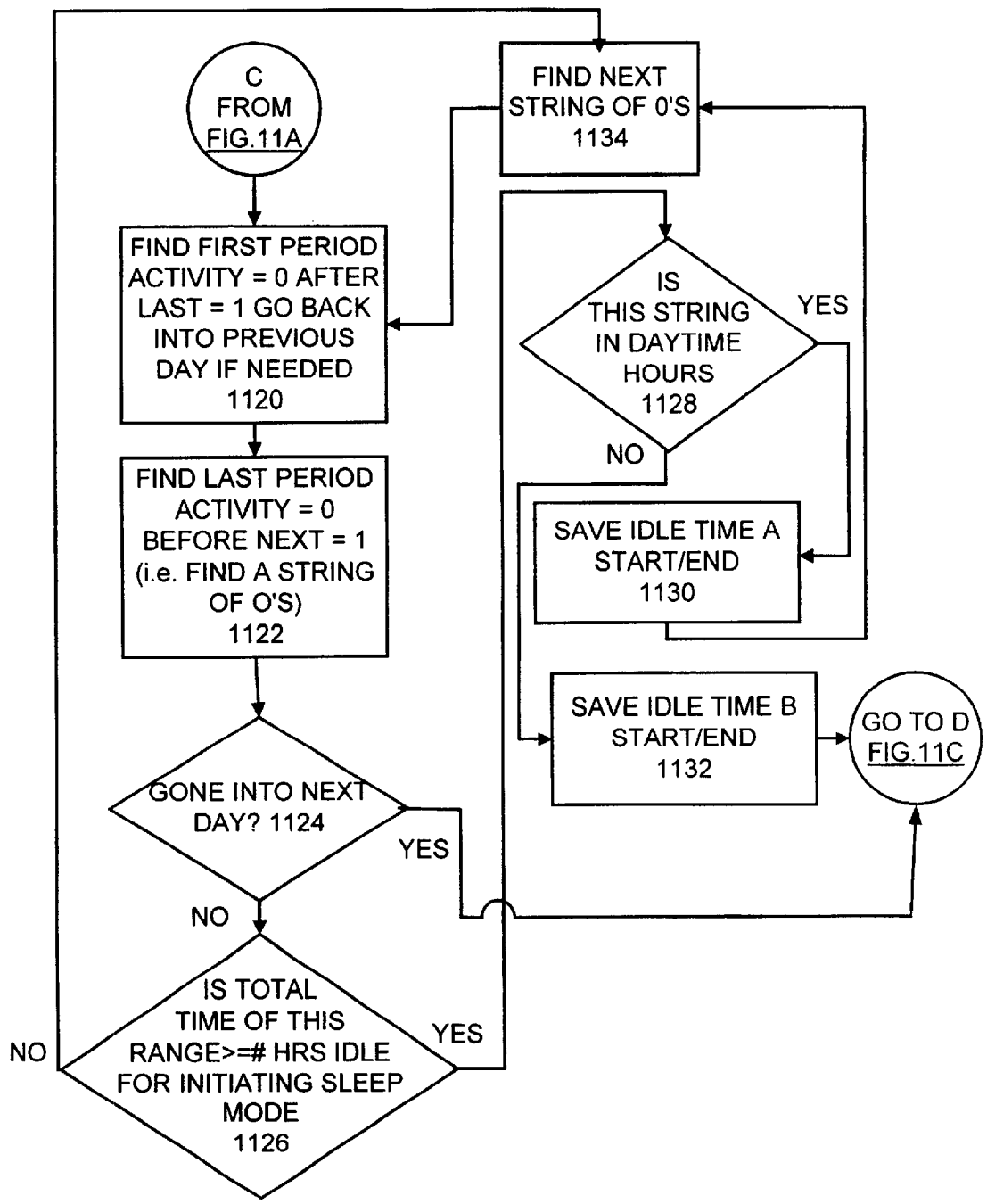
Figure 11C:
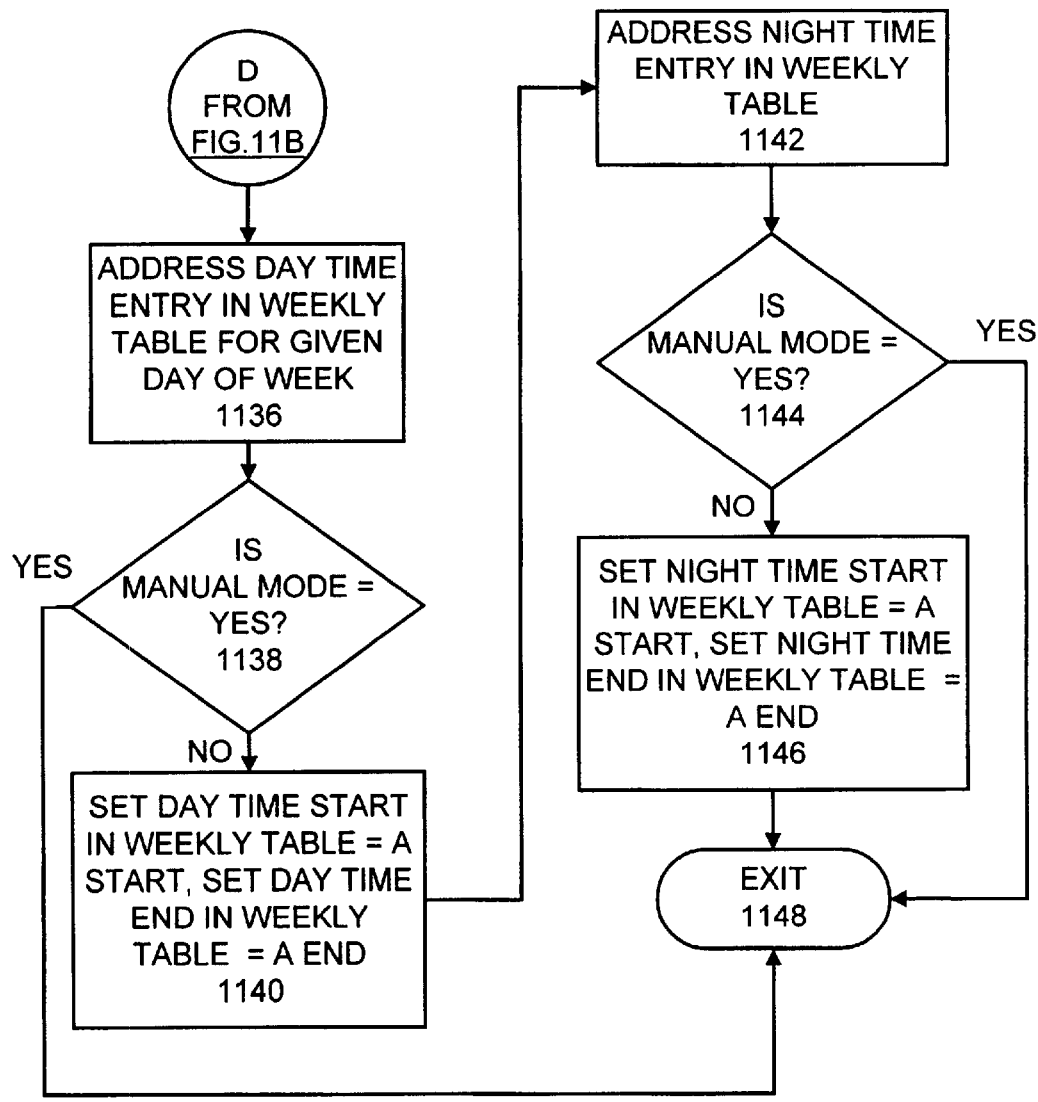

Referring to FIGS. 11A, 11B, and 11C, there are shown exemplary sequential steps for processing the history table for self-programmable temperature and usage control for hot water heaters in accordance with the preferred embodiment. The flow charts of FIGS. 11A, 11B, and 11C for processing the history table are called daily, for example, once per day at midnight. In FIG. 11A, sequential operations begin to process the history table as indicated in a block 1100. Checking whether the learning mode is ON is performed as indicated in a decision block 1102. When the learning mode is not ON, then the sequential operations are exited as indicated in a block 1104. A do loop is performed for each time slot for this day of week, for example, each slot for Monday, in the history table 1200 as indicated in a block 1106. Checking whether the activity this day is OFF is performed as indicated in a decision block 1108. When the activity this day is OFF, then MR(3)=MR(2); MR(2)=MR(1); and MR(1)=0 are set as indicated in a block 1110. Next, checking whether hot water has been used in any of the most recent 3 days in this time slot is performed, that is, is MR(3)=0; and MR(2)=0; and MR(1)=0 as indicated in a decision block 1112. If not, then the period activity is set to one as indicated in a block 1114. If true, then the period activity is set to zero as indicated in a block 1116. When the activity this day is not OFF in block 1108, then the period activity is set to one as indicated in a block 1114. Note that in this case MR(3)=MR(2); MR(2)=MR(1); and MR(1)=0 have already been done in block 912 of FIG. 9. Checking for the end of the do loop is performed as indicated in a decision block 1118. If not, then the sequential operations return to block 1106. When at the end of the do loop, then the sequential operations continue following entry point C in FIG. 11B.

Figure 13:
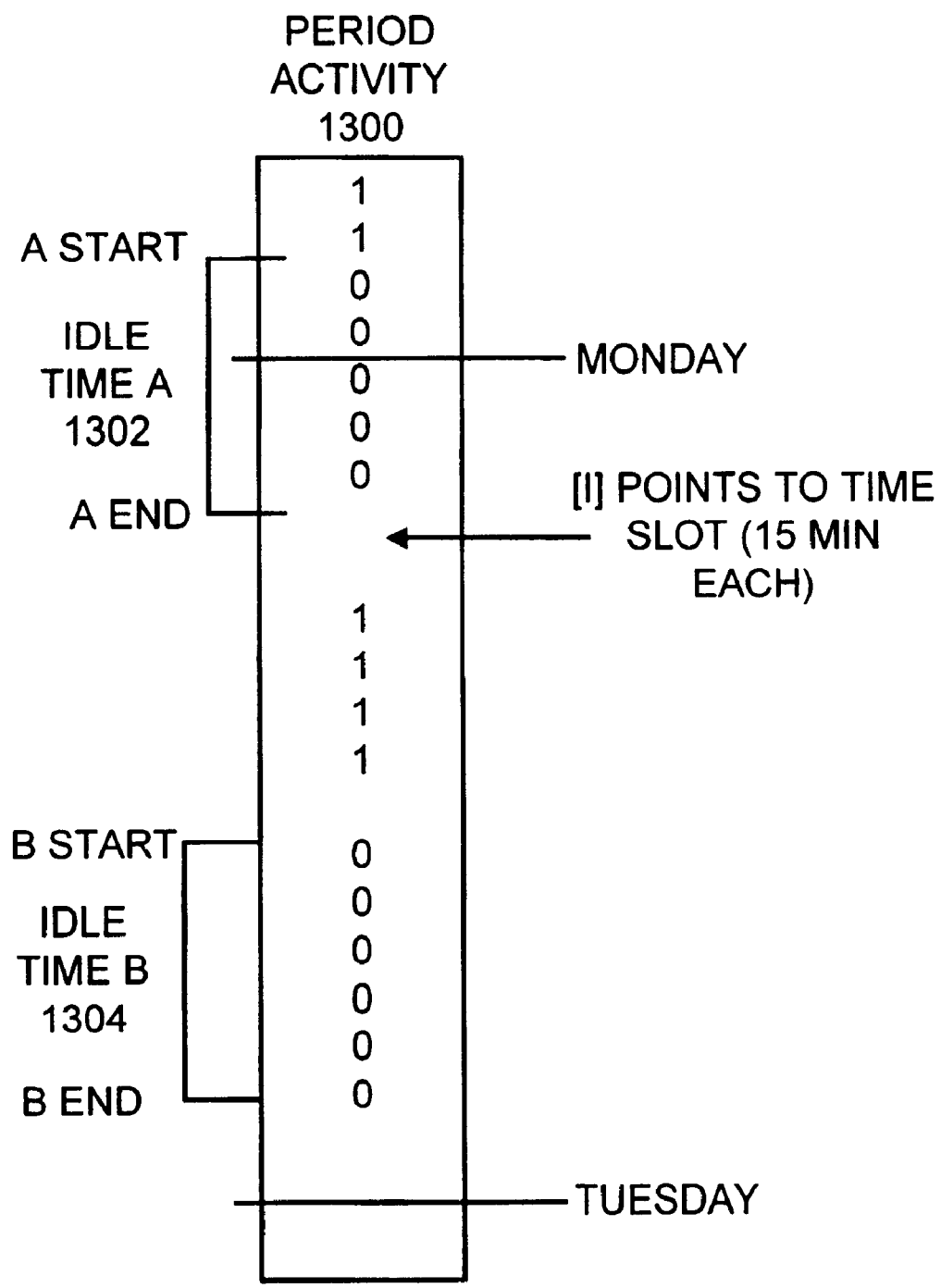

Referring now to FIG. 11B, processing the history table continues to find idle time range A and range B in a history table period activity 1300 illustrated and described with respect to FIG. 13. As indicated in a block 1120, a first period activity equal to zero after last equal to one is found, going back into previous day if needed. Next a last period activity equal to zero before next equal to one is found, i.e. a string of zeroes is found as indicated in a block 1122. Checking whether find step has gone into next day is preformed as indicated in a decision block 1224. If yes, then the sequential operations continue following entry point D in FIG. 11C. Otherwise checking whether the total time of this range is greater than or equal to the number of hours of idle for initiating sleep mode 218 as indicated in a decision block 1126. When the total time of this range is greater than or equal to the number of hours of idle for initiating sleep mode, then checking whether this string is in daytime hours, for example, between 4 A.M. and 4 P.M. as indicated in a decision block 1128. If so, then an idle time A start/end is saved as indicated in a block 1130. Otherwise, when this string is not in day daytime hours, then an idle time B start/end is saved as indicated in a block 1132. After saving idle time A at block 1130 and when the total time of this range is not greater than or equal to the number of hours of idle for initiating sleep mode at decision block 1126, then a next string of zeroes if found as indicated in a block 1134. Then the sequential operations return to block 1120.

Referring now to FIG. 11C, processing the history table continues to move idle time A and idle time B into the weekly table 200 for a given day of the week, for example, Monday. The daytime entry in the weekly table 200 for a given day of the week is addressed as indicated in a block 1136. Checking for manual mode equal to yes is performed as indicated in a decision block 1138. If the manual mode is not equal to yes, then as indicated in a block 1140 the day time start is set in the weekly table 200 equal to A start and the day time end is set in the weekly table 200 equal to A end from the history table period activity 1300 illustrated and described with respect to FIG. 12. Next the night time entry in the weekly table 200 is addressed as indicated in a block 1142. Checking for manual mode equal to yes is performed as indicated in a decision block 1144. If the manual mode is not equal to yes, then the night time start is set in the weekly table 200 equal to A start and the night time end is set in the weekly table 200 equal to A end from the history table period activity 1300 as indicated in a block 1146. When the manual mode is set to yes at decision blocks 1138 and 1144 and after the night time start and end are set in the weekly table 200 at block 1146, then the sequential operations are exited as indicated in a block 1148.

Referring now to FIGS. 12 and 13, there are shown charts respectively illustrating a history table 1200 and a more detailed history table period activity 1300 in accordance with the preferred embodiment. History table 1200 includes a day of week field 1202, which can be arranged as a date field, if needed. Next a time slot field 1204 includes for example, a set time interval, such as 15, 20, 30 minute intervals. A most recent (MR) field 1206 (1), (2), (3) stores water usage for the time slots for the last 3 days, where MR (1) indicates this 15 minute time slot had water usage (activity) 1 day ago. It should be understood that the most recent (MR) field 1206 can be configured to another number than the last 3 days, such as 2 days or 4 days. The activity this day field 1208 indicates that water was used at least once this day in this 15 minute time slot. The period activity 1210 means that MR (1), (2), (3) are not all zero, meaning that this time slot had activity once or more in the last 3 days.

FIG. 13 illustrates the more detailed history table period activity 1300. Examples of an idle time A 1302 with A start and A end times and an idle time B 1304 with B start and B end times are shown. Idle time means time the hot water heater is not used.

Referring now to FIGS. 14, and 15, there are shown flow charts illustrating exemplary sequential steps for self-programmable temperature and usage control for hot water heaters in accordance with the preferred embodiment. In FIG. 14, an event idle time start is applied to the CPU 102 by clock 104 as indicated in a block 1400. Thermostat 112 is set to a value of the sleep mode temperature as indicated in a block 1402. Then the sequential operations are exited as indicated in a block 1406.

In FIG. 15, an event idle time end is applied to the CPU 102 by clock 104 as indicated in a block 1500. The idle time end signal is applied to the CPU 102 about 30 minutes before the actual idle time end to allow time to heat the water. Thermostat 112 is set to a value of the normal temperature 212 as indicated in a block 1502. Then the sequential operations are exited as indicated in a block 1606.

Figure 16:
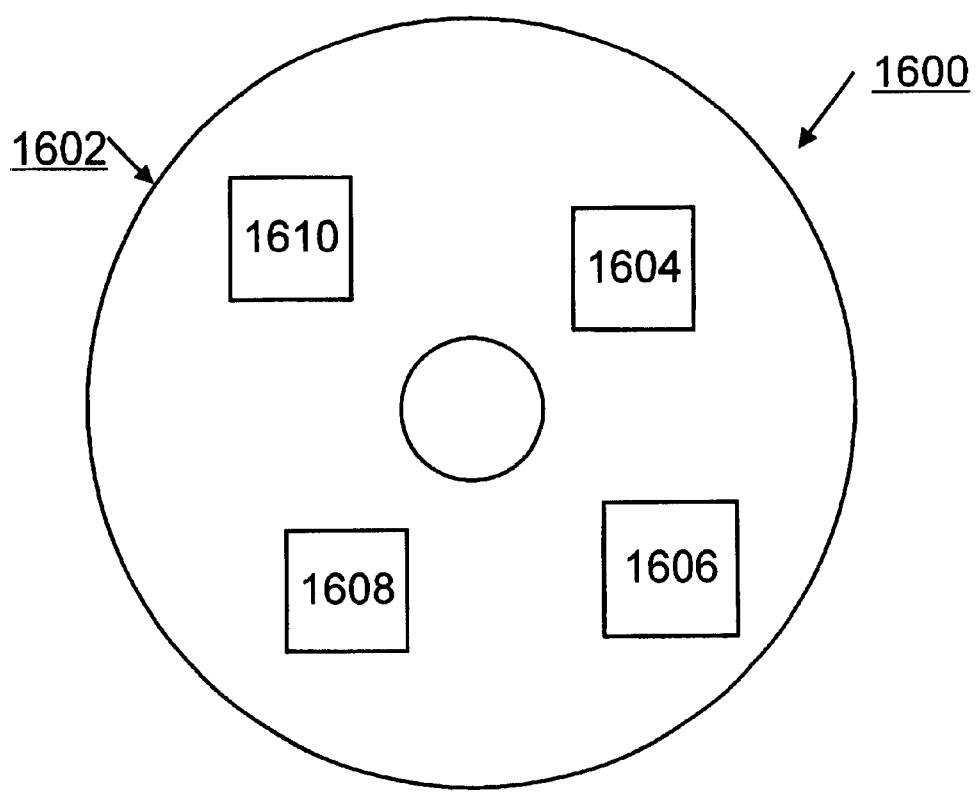
FIG. 16 is a block diagram illustrating a computer program product in accordance with the preferred embodiment.

Referring now to FIG. 16, an article of manufacture or a computer program product 1600 of the invention is illustrated. The computer program product 1600 includes a recording medium 1602, such as, a floppy disk, a high capacity read only memory in the form of an optically read compact disk or CD-ROM, a tape, a transmission type media such as a digital or analog communications link, or a similar computer program product. Recording medium 1602 stores program means 1604, 1606, 1608, 1610 on the medium 1602 for carrying out the methods for self-programmable temperature and usage control for hot water heaters of the preferred embodiment in the water heater control system 100 of FIG. 1.

A sequence of program instructions or a logical assembly of one or more interrelated modules defined by the recorded program means 1604, 1606, 1608, 1610, direct the computer system 100 for self-programmable temperature and usage control for hot water heaters of the preferred embodiment.

While the present invention has been described with reference to the details of the embodiments of the invention shown in the drawing, these details are not intended to limit the scope of the invention as claimed in the appended claims.

What is claimed is:

1. A computer-implemented method for self-programmable temperature and usage control for a hot water heater comprising the steps of:
   receiving a plurality of user entered selections;
   receiving an ON/OFF signal from a water meter indicating an ON/OFF state of water into the hot water heater;
   utilizing said ON/OFF signal to detect an idle period representing no water usage;
   detecting idle periods of a set time duration;
   responsive to an idle period start time, automatically setting a control temperature to a lower than normal temperature for an idle mode;
   responsive to an idle period end time, automatically setting said control temperature to a normal temperature;
   detecting and storing a number of idle days of no water usage;
   automatically entering a vacation mode responsive to a predefined number of idle days of no water usage and automatically setting said control temperature to a vacation temperature: and
   responsive to detecting an end of said detected no water usage, automatically setting said control temperature to said normal temperature.

2. A computer-implemented method for self-programmable temperature and usage control for a hot water heater as recited in claim 1 wherein said step of detecting idle periods of said set time duration includes the steps of identifying one of a user entered selection for said set time duration or a default value for said set time duration; and utilizing said ON/OFF signal from said water meter, detecting and storing a daily table including entries for water on, day of week and time values.

3. A computer-implemented method for self-programmable temperature and usage control for a hot water heater as recited in claim 1 includes the steps of identifying a user entered selection of vacation mode and entering said vacation mode.

4. A computer-implemented method for self-programmable temperature and usage control for a hot water heater as recited in claim 1 includes the step of automatically setting said control temperature to said normal temperature responsive to detecting water usage utilizing said ON/OFF signal from said water meter.

5. A computer-implemented method for self-programmable temperature and usage control for a hot water heater as recited in claim 1 wherein the step of entering said vacation mode includes the step of setting the hot water heater off.

6. A computer-implemented method for self-programmable temperature and usage control for a hot water heater as recited in claim 1 wherein the step of receiving a plurality of user entered selections includes the step of receiving said normal temperature, a sleep temperature for said idle mode and said vacation temperature for said vacation mode.

7. A computer-implemented method for self-programmable temperature and usage control for a hot water heater as recited in claim 1 wherein the step of receiving a plurality of user entered selections includes the step of receiving manual overrides of selected idle periods.

8. A computer-implemented method for self-programmable temperature and usage control for a hot water heater as recited in claim 1 wherein the step of receiving a plurality of user entered selections includes the steps of receiving a vacation mode start user entered selection and a vacation mode end user entered selection; automatically entering said vacation mode responsive to said received vacation mode start user entered selection; and automatically setting said control temperature to said normal temperature responsive to said received vacation mode end user entered selection.

9. A computer-implemented method for self-programmable temperature and usage control for a hot water heater as recited in claim 1 wherein the step of receiving a plurality of user entered selections includes the step of receiving an ON/OFF auto control user entered selection.

10. A computer-implemented method for self-programmable temperature and usage control for a hot water heater as recited in claim 1 includes the steps of processing a history table and finding idle time periods.

11. A computer-implemented method for self-programmable temperature and usage control for a hot water heater as recited in claim 10 includes the steps of moving identified idle time periods to a weekly table, said weekly table used for identifying said idle period start time and said idle period end time for said idle mode.

12. Apparatus for self-programmable temperature and usage control for a hot water heater comprising:
- a central processor unit;
- a clock coupled to said central processor unit for sending predefined events to said central processor unit;
- a user interface control coupled to said central processor unit for receiving a plurality of user entered selections;
- a water meter signal indicating an ON/OFF state of water into the hot water heater coupled to said central processor unit;
- said central processor unit arranged for detecting idle periods of a set time duration utilizing said water meter signal to detect an idle period; said idle period representing no water usage; for detecting and for storing a number of idle days of no water usage; responsive to an idle period start time, for automatically setting a control temperature to a lower than normal temperature for an idle mode; and responsive to an idle period end time, for automatically setting said control temperature to a normal temperature; responsive to a predefined number of idle days of no water usage, for automatically entering a vacation mode and for automatically setting said control temperature to a vacation temperature; and responsive to detecting an end of said detected no water usage, for automatically setting said control temperature to said normal temperature and for resetting said number of idle days of no water usage to zero.

13. Apparatus for self-programmable temperature and usage control for a hot water heater as recited in claim 12 includes a thermostat coupled to said central processor unit; and said central processor unit applies said control temperature to said thermostat.

14. Apparatus for self-programmable temperature and usage control for a hot water heater as recited in claim 13 includes a fuel valve coupled to said thermostat, and said thermostat providing a control signal to said fuel valve, responsive to said control temperature.

15. Apparatus for self-programmable temperature and usage control for a hot water heater as recited in claim 12 wherein said central processor unit utilizes said water meter signal for detecting water usage, and responsive to detecting water usage for automatically setting said control temperature to said normal temperature.

16. A computer program product for implementing self-programmable temperature and usage control for a hot water heater control system including a central processor unit, said computer program product including a plurality of computer executable instructions stored on a computer readable medium, wherein said instructions, when executed by said central processor unit, cause the central processor unit to perform the steps of:
- receiving a plurality of user entered selections;
- receiving a water meter signal indicating an ON/OFF state of water into the hot water heater to detect an idle period; said idle period representing no water usage;
- detecting idle periods of a set time duration;
- storing said detected idle periods in a weekly table;
- responsive to an idle period start time in said weekly table, automatically setting a control temperature to a lower than normal temperature for an idle mode;
- responsive to an idle period end time in said weekly table, automatically setting said control temperature to a normal temperature;
- detecting and storing a number of idle days of no water usage;
- automatically entering a vacation mode responsive to a predefined number of idle days of no water usage and automatically setting said control temperature to a vacation temperature; and
- responsive to detecting an end of said detected no water usage, automatically setting said control temperature to said normal temperature.

17. A computer program product self-programmable temperature and usage control for a hot water heater control system as recited in claim 16 wherein said instructions, when executed by said central processor unit, cause the central processor unit to perform the steps of identifying a predefined user entered selection of vacation mode and entering said vacation mode.

18. A computer program product self-programmable temperature and usage control for a hot water heater control system as recited in claim 16 wherein the step of detecting idle periods of a set time duration includes the step of utilizing said ON/OFF signal from said water meter, detecting and storing a daily table including entries for water on, day of week and time values.

19. A computer program product self-programmable temperature and usage control for a hot water heater control system as recited in claim 16 wherein the step of automatically entering a vacation mode includes the step of setting the hot water heater to off.

20. A computer program product self-programmable temperature and usage control for a hot water heater control system as recited in claim 16 wherein the step of receiving said plurality of user entered selections includes the step of receiving said normal temperature, a sleep temperature for said idle mode and said vacation temperature for said vacation mode.

* * * * *